US012485153B1

(12) United States Patent
Sanchez Alonso

(10) Patent No.: US 12,485,153 B1
(45) Date of Patent: Dec. 2, 2025

(54) SUBSTANCE FOR THE TREATMENT OF POXVIRUS

(71) Applicant: Elena Sanchez Alonso, Opa Locka, FL (US)

(72) Inventor: Elena Sanchez Alonso, Opa Locka, FL (US)

( * ) Notice: Subject to any disclaimer, the term of this patent is extended or adjusted under 35 U.S.C. 154(b) by 358 days.

(21) Appl. No.: 18/144,385

(22) Filed: May 8, 2023

Related U.S. Application Data

(63) Continuation-in-part of application No. 17/349,267, filed on Jun. 16, 2021, now abandoned.

(51) Int. Cl.

| | |
|---|---|
| *A61K 36/00* | (2006.01) |
| *A61K 9/00* | (2006.01) |
| *A61K 36/22* | (2006.01) |
| *A61K 36/886* | (2006.01) |
| *A61K 47/44* | (2017.01) |

(52) U.S. Cl.
CPC ............ *A61K 36/22* (2013.01); *A61K 9/0014* (2013.01); *A61K 36/886* (2013.01); *A61K 47/44* (2013.01)

(58) Field of Classification Search
CPC .................................................... A61K 9/0014
See application file for complete search history.

(56) References Cited

U.S. PATENT DOCUMENTS

| | | | |
|---|---|---|---|
| 9,694,068 | B2 | 7/2017 | Golovkin |
| 10,220,066 | B2 | 3/2019 | Angle |

*Primary Examiner* — Qiuwen Mi
(74) *Attorney, Agent, or Firm* — Sanchelima & Associates, P.A.; Jesus Sanchelima; Christian Sanchelima

(57) ABSTRACT

A substance for the treatment of poxvirus including *Anacardium occidentale* seed extract oil, sunflower oil and an excipient. The *Anacardium occidentale* seed extract oil and the sunflower oil are mixed and heated together at a predetermined temperature. The excipient is aloe vera or white petrolatum. The substance is topically applied in human skin for relief of poxvirus infection symptoms.

7 Claims, 1 Drawing Sheet

| Item | Percentage (% v/v) | Name |
|---|---|---|
| 20 | 2% to 4% | Anacardium occidentale seed extract oil |
| 40 | 2% to 4% | Sunflower oil |
| 60 | 92% to 96% | Excipient |

FIG. 1

| Percentage (% v/v) | Item name |
|---|---|
| 35% to 45% | Anacardic acid |
| 25% to 35% | Resoulcinolic lipis |
| 25% to 35% | Lysines |

FIG. 2

SUBSTANCE FOR THE TREATMENT OF POXVIRUS

OTHER RELATED APPLICATIONS

The present application is a continuation-in-part of pending U.S. patent application Ser. No. 17/349,267, filed on Jun. 16, 2021, which is hereby incorporated by reference.

BACKGROUND OF THE INVENTION

1. Field of the Invention

The present invention relates to a substance for the treatment of poxvirus and, more particularly, to a substance for the treatment of poxvirus that is topically applied to reduce poxvirus symptoms on the user's skin while providing relief thereto.

2. Description of the Related Art

Several substances for pox virus treatment have been produced in the past. None of them, however, have used a combination of *Anacardium occidentale* seeds and sunflower oil, where the whole pieces of *Anacardium occidentale* seed are used by separating the nocive products such as the urushiol therefrom.

Applicant believes that a related reference corresponds to U.S. Pat. No. 10,220,066 issued for a treatment of virus-based diseases of the skin. The treatment includes topically administering an aqueous substance of plant oil extract from a dandelion to a patient's skin that is suffering from a virus-based disease. Applicant believes that another related reference corresponds to U.S. Pat. No. 9,694,068 issued for compositions and methods for procuring plant-derived compositions to aid the treatment of poxvirus molluscum infections. The plants are engineered to produce antigenic proteins.

Yet, another related reference corresponds to utility patent application CN 108991488A for a method for preparing nut chili sauce. However, the cited references differ from the present invention because they fail to provide a substance derived from a mixture of triturated *Anacardium occidentale* seeds and sunflower oil. Where the mixture is subjected to a thermal process. The substance is then topically applied to the human skin for the treatment of poxvirus molluscum infections and other bacteria and skin infections. The substance produced is oily in nature that allows the substance to be easily applied to the human skin. CN 108991488A includes crushing cashews (along with red pepper, beed, garlic and peanuts) mixed and heated with a 3% of sunflower oil. CN 108991488A however, fails to disclose the combination of components of the present invention in such a way that produces the benefits described.

The use of *Anacardium occidentale* has also been studied in the prior art to as exhibiting antimicrobial, antioxidant and anticancer properties. The present substance took the use of *Anacardium occidentale* and related art for skin treatment, including burn treatment and, by addition of oil and modified through a thermal process to provide a substance which is efficient for treatment of poxvirus molluscum infection.

Anacardic acids are phenolic lipids, chemical compounds found in the shell of the cashew nut (*Anacardium occidentale*). Propionic acid is one of the phenolic lipids that can be derived from anacardic acids. Propionic acid is also known in the art as being produced through synthetic methods, while the present invention is produced through natural methods. Propionic acid has been used in pharmaceutical products such as: 1. The Fluticasone Propionate which is based on a propionic acid; and 2. The Tecovirmat, for monkeypox. Propionic acid is also known as a substance produced by *Propionibacterium acnes* to regulate skin pH and for its antimicrobial activity. Hence, the propionic acid is a result of the present method, where the propionic acid exhibits properties known in the prior art and inherent properties of the *Anacardium occidentale*, while providing a natural-based method, which differs from traditional methods for producing a propionic acid which present no benefits or the specific characteristics of the propionic acid obtained by the present natural-base method. Propionic acid obtained is the active ingredient of the present substance which provides relief to the user's skin. Substance obtained includes as active principle a carboxylic acid R—COOH, from carboxyl group being a monocarboxylic acid represented by a nucleic acid of plant origin, obtained from the *Anacardium occidentale* seeds as a solute that has similar characteristics to acetylsalicylic acid in relation to its functions.

Another propionic acids-based medicaments are being investigated to a diet of insulin, it suppresses inflammation and improves liver ischemia and reperfusion injury in mice and even helps in liver surgeries. Propionic acids have also been produced on human skin to regulate sweat production. However, the present substance includes a polyunsaturated vegetable organic compound that provides new benefits with action in the form of a propionic acid by not being extracted purely, but with an oily solvent that is capable of purifying it and stabilizing it in the redox process that leads them to reduce and eliminate substances that cause allergies and unfavorable irritations for treatments.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a substance for the treatment of poxvirus molluscum infections which aids in the treatment of poxvirus by reducing the symptoms manifested on a patient's skin, and prevents symptoms from recurring.

It is another object of this invention to provide a substance for the treatment of poxvirus molluscum infections which utilizes *Anacardium occidentale* seeds to create a substance for the treatment of poxvirus.

It is another object of this invention to provide a substance for the treatment of poxvirus molluscum infections which is obtained from a trituration process and a washing process to eliminate urushiol from the *Anacardium occidentale* seeds.

It is still another object of the present invention to provide a substance for the treatment of poxvirus which is obtained using the whole *Anacardium occidentale* seeds, while the prior art normally uses the seed shell. Hence, providing a substance inexpensive to implement.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a table illustrating the main compounds of the substance 10.

FIG. 2 shows a table illustrating the constituent parts of the first component 20.

DETAILED DESCRIPTION OF THE EMBODIMENTS OF THE INVENTION

Referring now to the drawings, where the present invention is generally referred to with numeral 10, it can be observed that it basically includes a first component 20, a second component 40 and a third component 60. As best illustrated in FIG. 1 the first component 20 may be an *Anacardium occidentale* seed extract oil. *Anacardium occidentale* seed extracts have been obtained before. However, in the present invention 10 the first component 20 includes a propionic acid, which provides medicinal properties not observed in the prior art. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The first component 20 may be obtained from *Anacardium occidentale* seeds. In a preferred embodiment the *Anacardium occidentale* seeds are washed to remove any external element therefrom. The *Anacardium occidentale* seeds are then dried. Drying eliminates part of the urushiol content in the *Anacardium occidentale* seeds. Urushiol is an oily mixture of organic compounds with allergenic properties. Urushiol may produce dermatitis. In a preferred embodiment humidity percentage of the *Anacardium occidentale* seeds after drying is 8%-30%. In a preferred embodiment drying is performed by applying a heat flux through the *Anacardium occidentale* seeds. After drying, the *Anacardium occidentale* seeds are heated using oil and then introduced into an oil extractor machine in such a manner that the first component 20 is obtained in the way of an oil extract of *Anacardium occidentale* seeds.

The first component 20 may include the extract from the pericarp and endocarp of the *Anacardium occidentale* seed. This seed contains various compounds and acids which targets the skin and positively affects the skin. The seed also contains catechol which softens the targeted area of the skin. Furthermore, the seed contains resorcinol which helps with scarring in the skin and allows the substance to enter the resulting substance from the process in penetrating skin cells. Additionally, the seed contains hydroquinone and cardanol which aids in the pigmentation of the skin. The *Anacardium occidentale* seeds include zinc, magnesium, potassium. The *Anacardium occidentale* seeds include Anacardic Acid, where anacardic acid is the main compound to react for producing substance 10. Chemical composition of anacardic acid is $C_{22}H_{30}O_3$. Anacardic acid $C_{22}H_{30}O_3$ may produce a series of phenolic lipids including propionic acid which may be part of the first component 20. As best illustrated in FIG. 2 the first component 20 may include anacardic acid in 35% v/v to 45% v/v. Anacardic acid may include a salicylic acid, acid 2-hydroxy-6 [(8Z,112) pentadeca-8,11,14-trienil] benzoic. The anacardic acid contained in the first component 20 may be a Phyto-therapeutic type agent substance useful for the treatment of viral papules and infections caused by poxviruses since it acts against the capsid of infested cells hosted in a human skin cell. The first component 20 may also include resolucionolic lipids working in 25% v/v to 35% v/v as an agent that helps to treat pain caused by viral infections of the molluscum type, for itching caused by the virus, helps heal injuries and heal burns or sores. The first component 20 may also include lysine in 25% v/v to 35% v/v as an antiviral that contributes to the production of carnitine and the formation of collagen, constituting the new element that allows the antiviral action to be carried out in this new substance.

The *Anacardium occidentale* seeds include phenol groups which are a class of chemical compounds consisting of one or more hydroxyl groups bounded directory to an aromatic hydrocarbon group. The phenol groups include Phenol OH and Phenols=C6 with chromatic rings $C6-Cx^3C_6$ side chain carbon ridges containing catechol, resorcinol, and hydroquinone lipids. These lipids contain corrective properties which correct the dryness of human skin to retain water. First component 20 may include such phenol groups. First component 20 may be urushiol free.

Referring now to second component 40 it can be observed that in a preferred embodiment the second component 40 may be sunflower oil. It also may be suitable for the second component to be a primrose oil. The first component 20 and the second component 40 may be mixed together while applying a heating process at 80° C. to 100° C. therefore defining an homogeneous mixture. The homogenous mixture may be mixed with the third component 60 at an average temperature of 20° C. to 40° C. In a preferred embodiment the third component 60 may be an excipient. Therefore, the homogenous mixture of the first component 20 and the second component 40 may be 4% v/v to 6% v/v of the present composition. The first component 20 may be a 2% v/v to a 4% v/v. The second component 40 may be a 2% v/v to a 4% v/v of the present composition. In a preferred embodiment the third component 60 may be aloe vera gel. It also may be suitable for the third component 60 to be calamine, petrolatum, or the like.

Sunflower oil is chosen specifically for its concentration of linoleic acid which plays a role in providing moisture to the skin without weighing down the skin. The linoleic acid further helps to fend off UV rays and air pollutants. Sunflower oil contains a concentration of about 68% linoleic acid which is the preferred concentration of linoleic acid needed for the process. Other types of oils which contain a concentration higher than 65% linoleic acid may be used. These oils may include but are not limited to safflower oil (78% concentration of linoleic acid), grape seed oil (73% concentration of linoleic acid), and evening primrose oil (74% of linoleic acid).

The main compound in substance 10, product of the chemical reaction of the oil and the *Anacardium occidentale* seeds, and the unlinking of carbon chains because of the heating process, may be an anacardic acid including different phenol groups. The main phenol group within the anacardic acid may be a propionic acid. Where the propionic acid has a chemical formula of $CH_3CH_2CO_2H$ and includes n-6 and n-3 series of polyunsaturated fatty acids. It should be understood that the biological substances of first component 20 may have been dissolved in the first component 40 as an hydrocarbon medium of hydroquinone lipids by the biomagnification itself of the extraction process and may cooperate in the deactivation of Urushiol. The catechols of *Anacardium occidentale* may be oxidized and reduced. A carbonated substance may be obtained due to the carbons presented therein. The carbonated substance is reduced due to the hydroxyls and nitrogenated, all of them reduced, neutralized and stable. It should be noted that heat and pressure applied to the *anacardium* seeds and the oil may produce reduction of the toxic volatile halides and vinyls contained therein.

Substance 10 may then be topically applied to a human in need of relief and being affected by symptoms of poxvirus molluscum infections. The oily substance 10 is topically applied to the skin of the human in need of relief of symptoms. In one embodiment the area of the skin is further provided with a patch to secure the topically applied substance in place and allow the substance to take effect and relieve the symptoms of the human in need. The substance contains various lipids which are beneficial to the human skin and aid in the treatment of poxvirus molluscum infections by inflammation and redness on the human skin. The substance also proves effective by reducing pain and inflammation caused by the human papilloma virus and may further be used to treat the skin for other inflammation relief. When applied to the human skin, substance 10 proves effective in the treatment of poxvirus molluscum infections. It should be understood that similar results are not obtained by simply mixing oil with *Anacardium occidentale* seeds and heating. In order to obtain substance 10 it is necessary to prepare the seeds as described to be heated along with the sunflower oil, introduced in the oil extractor and mix the extract with the sunflower oil.

Substance 10 may be a propionic acid-type compound product, different from being enriched and where it plays its main role as an active drug ingredient. Substance 10 may be that stimulates the immune system. Substance 10 may be an antiviral inhibitor of enzymes present in the envelope of the capsid of viruses.

Substance 10 is a nourishing compound for the skin, of an organic type due to the content of fatty acids from the bases of green chemistry and because it contains part of a group of amino acid n-6 and n-3 polyunsaturated protein enzymes, which have double bonds in cis, separated by methylene groups with a monocarboxylic active ingredient as a derivative of ethanoic acid, forming a new type of organic carboxylate ion with weak bases and capable of reacting by substitution nucleophiles for a general formula (R—COOH), obtained from an organic acid reaction with no ion metallic, but with a Hydrogen. Substance 10 may be an antiviral enzyme inhibitor by naturally joining other homologous fatty acids in the process that balance it and be able to act against the virion capsid of the infectious mollusk and thus not damage the skin since it is stabilized, thus avoiding irritating effects or discomfort for allergies. Substance 10 may inhibit the virion enzyme from the capsid.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A substance for the treatment of poxvirus, comprising:
    a 2% v/v to 4% v/v of *Anacardium occidentale* seed extract oil, wherein said *Anacardium occidentale* seed extract oil is obtained from washing *Anacardium occidentale* seeds to remove external elements, drying said *Anacardium occidentale* seeds to eliminate part of urushiol content until a humidity percentage of 8% to 30% is achieved, triturating said dried *Anacardium occidentale* seeds, heating said triturated *Anacardium occidentale* seeds using oil, and introducing said heated and triturated *Anacardium occidentale* seeds into an oil extracting machine to obtain said *Anacardium occidentale* seed extract oil whereby urushiol is deactivated through oxidation and reduction of catechols, carbon chains are unlinked to produce propionic acid from anacardic acid as an active ingredient, and a carbonated material is reduced due to hydroxyls and nitrogenated components all of those components, neutralized, and stabilized, resulting in said *Anacardium occidentale* seed extract oil having antimicrobial and anti-inflammatory properties not present in untreated *Anacardium occidentale* seeds;
    a 2% v/v to 4% v/v of sunflower oil, wherein said *Anacardium occidentale* seed extract oil and said sunflower oil are mixed together while applying a heating process at 80° C. to 100° C. to define a homogeneous mixture through a chemical reaction that further unlinks carbon chains and stabilizes polyunsaturated fatty acids in a redox process; and
    a 96% v/v to 92% v/v of an excipient, wherein said homogeneous mixture is mixed with said excipient at an average temperature of 20° C. to 40° C.

2. The substance for the treatment of poxvirus set forth in claim 1, wherein said *Anacardium occidentale* seed extract oil includes resorcinolic lipids in a 25% to 35%, lysines in a 25% to 35%, and anacardic acid in a 35% to 45%.

3. The substance for the treatment of poxvirus set forth in claim 1, wherein said *Anacardium occidentale* seed extract oil includes propionic acid having a chemical composition $CH_3CH_2CO_2H$.

4. The substance for the treatment of poxvirus set forth in claim 1, wherein said substance is configured to be topically applied in human skin for relief of poxvirus infection symptoms.

5. The substance for the treatment of poxvirus set forth in claim 1, wherein said excipient is an aloe vera gel.

6. A substance for the treatment of poxvirus, comprising:
    a 2% v/v to 4% v/v of *Anacardium occidentale* seed extract oil, wherein said *Anacardium occidentale* seed extract oil includes resorcinolic lipids in a 25% to 35%, lysines in a 25% to 35%, and anacardic acid in a 35% to 45%, wherein said *Anacardium occidentale* seed extract oil is obtained from washing *Anacardium occidentale* seeds to remove external elements, drying said *Anacardium occidentale* seeds to eliminate part of urushiol content until a humidity percentage of 8% to 30% is achieved, triturating said dried *Anacardium occidentale* seeds, heating said triturated *Anacardium occidentale* seeds using oil, and introducing said heated and triturated *Anacardium occidentale* seeds into an oil extracting machine to obtain said *Anacardium occidentale* seed extract oil, whereby urushiol is deactivated through oxidation and reduction of catechols, carbon chains are unlinked to produce propionic acid from anacardic acid as an active ingredient, and a carbonated material is reduced due to hydroxyls and nitrogenated components, all of those components, neutralized, and stabilized, resulting in said *Anacardium occidentale* seed extract oil having antimicrobial and anti-inflammatory properties not present in untreated *Anacardium occidentale* seeds;

a 2% v/v to 4% v/v of sunflower oil, wherein said *Anacardium occidentale* seed extract oil and said sunflower oil are heated at a temperature of 80° C. to 100° C. and mixed at said temperature, to define a homogeneous mixture through a chemical reaction that further unlinks carbon chains and stabilizes polyunsaturated fatty acids in a redox process; and a 96% v/v to 92% v/v of an excipient, wherein said substance is configured to be topically applied in human skin for relief of poxvirus infection symptoms and wherein said homogeneous mixture is mixed with said excipient at an average temperature of 20° C. to 40° C.

7. A substance for the treatment of poxvirus, consisting of a 2% v/v to 4% v/v of *Anacardium occidentale* seed extract oil, wherein said *Anacardium occidentale* seed extract oil includes resorcinolic lipids in a 25% to 35%, lysines in a 25% to 35%, and anacardic acid in a 35% to 45%, wherein said *Anacardium occidentale* seed extract oil is obtained from dry and triturated *Anacardium occidentale* seeds by means of an oil extracting machine, said *Anacardium occidentale* seeds are dried up to a humidity percentage of 8% to 30% after drying, and from washing said *Anacardium occidentale* seeds to remove external elements, whereby urushiol is deactivated through oxidation and reduction of catechols, carbon chains are unlinked to produce propionic acid from anacardic acid as an active ingredient, and a carbonated material is reduced due to hydroxyls and nitrogenated components, all of those components, neutralized, and stabilized, resulting in said *Anacardium occidentale* seed extract oil having antimicrobial and anti-inflammatory properties not present in untreated *Anacardium occidentale* seeds; wherein said *Anacardium occidentale* seed extract oil includes propionic acid having a chemical composition $CH_3CH_2CO_2H$;

a 2% v/v to 4% v/v of sunflower oil, wherein said *Anacardium occidentale* seed extract oil and said sunflower oil are heated at a temperature of 80° C. to 100° C. and mixed at said temperature, to define a homogeneous mixture through a chemical reaction that further unlinks carbon chains and stabilizes polyunsaturated fatty acids in a redox process; and a 96% v/v to 92% v/v of aloe vera, wherein said substance is configured to be topically applied in human skin for relief of poxvirus infection symptoms, and wherein said homogeneous mixture is mixed with said aloe vera at an average temperature of 20° C. to 40° C.

* * * * *